(12) United States Patent
Danican et al.

(10) Patent No.: US 12,473,486 B2
(45) Date of Patent: Nov. 18, 2025

(54) SINGLE-PHASE RETARDED ACID BASED ON A CATIONIC SURFACTANT

(71) Applicant: Schlumberger Technology Corporation, Sugar Land, TX (US)

(72) Inventors: Samuel Danican, Sugar Land, TX (US); Haiyan Zhao, Sugar Land, TX (US); Patrice Abivin, Houston, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 18/723,901

(22) PCT Filed: Mar. 23, 2023

(86) PCT No.: PCT/US2023/016032
§ 371 (c)(1),
(2) Date: Jun. 25, 2024

(87) PCT Pub. No.: WO2023/183465
PCT Pub. Date: Sep. 28, 2023

(65) Prior Publication Data
US 2025/0075123 A1    Mar. 6, 2025

Related U.S. Application Data

(60) Provisional application No. 63/269,813, filed on Mar. 23, 2022.

(51) Int. Cl.
*C09K 8/76*    (2006.01)

(52) U.S. Cl.
CPC ............ *C09K 8/76* (2013.01); *C09K 2208/28* (2013.01); *C09K 2208/32* (2013.01)

(58) Field of Classification Search
CPC .... C09K 8/76; C09K 2208/28; C09L 2208/32
See application file for complete search history.

(56) References Cited

U.S. PATENT DOCUMENTS

| | | |
|---|---|---|
| 2,485,529 A | 10/1949 | Cardwell |
| 3,681,240 A | 8/1972 | Fast |
| 3,826,312 A | 7/1974 | Richardson |
| 3,920,566 A | 11/1975 | Richardson |

(Continued)

FOREIGN PATENT DOCUMENTS

| | | |
|---|---|---|
| CN | 105349131 A | 2/2016 |
| CN | 105670599 A | 6/2016 |

(Continued)

OTHER PUBLICATIONS

Al-Ghamdi, A. H.; et al., "Acid Diversion by Use of Viscoelastic Surfactants: The Effects of Flow Rate and Initial Permeability Contrast." SPE 142564, Dec. 2014, SPE Journal, pp. 1203-1216.

(Continued)

*Primary Examiner* — Silvana C Runyan
(74) *Attorney, Agent, or Firm* — Jeffrey D. Frantz

(57) ABSTRACT

Compositions for matrix acidizing and fracture acidizing contain water, an acid, and an acid retarding agent including an alkyl dimethyl benzyl ammonium chloride surfactant. The composition may be prepared and injected into a wellbore penetrating a subterranean formation.

10 Claims, 3 Drawing Sheets

(56) References Cited

U.S. PATENT DOCUMENTS

| | | | |
|---|---|---|---|
| 4,140,640 A | 2/1979 | Scherubel |
| 4,368,136 A | 1/1983 | Murphey |
| 4,420,414 A | 12/1983 | Valone |
| 4,466,893 A | 8/1984 | Dill |
| 4,702,848 A | 10/1987 | Payne |
| 4,703,797 A | 11/1987 | Djabbarah |
| 4,730,676 A | 3/1988 | Luers |
| 4,747,975 A | 5/1988 | Ritter |
| 4,807,703 A | 2/1989 | Jennings, Jr. |
| 5,120,471 A | 6/1992 | Jasinski |
| 5,220,960 A | 6/1993 | Totten |
| 5,310,002 A | 5/1994 | Blauch |
| 5,327,973 A | 7/1994 | Jennings, Jr. |
| 5,547,022 A | 8/1996 | Juprasert |
| 5,773,024 A | 6/1998 | Unger |
| 5,990,051 A | 11/1999 | Ischy |
| 6,117,364 A | 9/2000 | Vorderbruggen |
| 6,196,318 B1 | 3/2001 | Gong |
| 6,436,880 B1 | 8/2002 | Frenier |
| 7,148,184 B2 | 12/2006 | Francini |
| 7,237,608 B2 | 7/2007 | Fu |
| 7,350,572 B2 | 4/2008 | Fredd |
| 7,603,261 B2 | 10/2009 | Tardy |
| 7,615,516 B2 | 11/2009 | Yang |
| 7,635,028 B2 | 12/2009 | Li |
| 7,696,393 B2 | 4/2010 | Rivers |
| 7,774,183 B2 | 8/2010 | Tardy |
| 7,833,947 B1 | 11/2010 | Kubala |
| 7,915,205 B2 | 3/2011 | Smith |
| 8,163,102 B1 | 4/2012 | MacDonald |
| 8,551,926 B2 | 10/2013 | Huang |
| 8,580,047 B1 | 11/2013 | MacDonald |
| 8,940,106 B1 | 1/2015 | MacDonald |
| 9,034,806 B2 | 5/2015 | Gurmen |
| 9,085,975 B2 | 7/2015 | Abad |
| 9,376,611 B2 | 6/2016 | Berry |
| 9,573,808 B2 | 2/2017 | Jiang |
| 9,796,490 B2 | 10/2017 | Jiang |
| 9,809,716 B2 | 11/2017 | Beuterbaugh |
| 9,920,606 B2 | 3/2018 | Jiang |
| 10,035,944 B2 | 7/2018 | Purdy |
| 10,131,831 B2 | 11/2018 | Rimassa |
| 10,378,325 B2 | 8/2019 | Panga |
| 10,703,957 B2 | 7/2020 | Al-Yami |
| 10,767,474 B2 | 9/2020 | Feng |
| 10,787,606 B2 | 9/2020 | Weider |
| 10,954,432 B2 | 3/2021 | Panga |
| 10,982,133 B2 | 4/2021 | Purdy |
| 11,091,689 B2 | 8/2021 | Daeffler |
| 11,098,241 B2 | 8/2021 | Purdy |
| 11,168,244 B2 | 11/2021 | Phan |
| 2002/0023752 A1 | 2/2002 | Qu |
| 2002/0147114 A1 | 10/2002 | Dobson |
| 2004/0009880 A1* | 1/2004 | Fu .................. C09K 8/68 |
| | | 507/200 |
| 2004/0129418 A1 | 7/2004 | Jee |
| 2005/0124500 A1* | 6/2005 | Chen .................. C09K 8/516 |
| | | 516/198 |
| 2006/0042797 A1 | 3/2006 | Fredd |
| 2006/0102349 A1 | 5/2006 | Brady |
| 2006/0180308 A1 | 8/2006 | Welton |
| 2007/0235189 A1 | 10/2007 | Milne |
| 2007/0293404 A1 | 12/2007 | Hutchins |
| 2008/0139412 A1 | 6/2008 | Fuller |
| 2008/0200353 A1 | 8/2008 | Dahayanake |
| 2008/0269081 A1 | 10/2008 | Lin |
| 2008/0289828 A1 | 11/2008 | Hutchins |
| 2008/0314594 A1 | 12/2008 | Still |
| 2009/0247431 A1 | 10/2009 | Gupta |
| 2010/0010106 A1 | 1/2010 | Crews |
| 2010/0022418 A1 | 1/2010 | Milne |
| 2010/0224365 A1 | 9/2010 | Abad |
| 2010/0243242 A1 | 9/2010 | Boney |
| 2010/0248996 A1 | 9/2010 | Sawdon |
| 2010/0331223 A1 | 12/2010 | Li |
| 2011/0036583 A1 | 2/2011 | Willberg |
| 2012/0238479 A1 | 9/2012 | Choudhary |
| 2013/0025870 A1 | 1/2013 | Berry |
| 2013/0032345 A1 | 2/2013 | Freese |
| 2013/0261032 A1 | 10/2013 | Ladva |
| 2013/0327531 A1 | 12/2013 | Dahayanake |
| 2014/0116708 A1 | 5/2014 | Wadekar |
| 2014/0166291 A1 | 6/2014 | Friesen |
| 2014/0166589 A1 | 6/2014 | Hicks |
| 2014/0171345 A1 | 6/2014 | Steiner |
| 2014/0174742 A1 | 6/2014 | Mirakyan |
| 2014/0212006 A1 | 7/2014 | Zhao |
| 2014/0246198 A1 | 9/2014 | Pandya |
| 2014/0256604 A1 | 9/2014 | Wadekar |
| 2014/0329725 A1 | 11/2014 | Karale |
| 2014/0367100 A1 | 12/2014 | Oliveira |
| 2015/0027702 A1* | 1/2015 | Godoy-Vargas ....... C09K 8/512 |
| | | 507/224 |
| 2015/0034315 A1 | 2/2015 | Jiang |
| 2015/0034318 A1 | 2/2015 | Jiang |
| 2015/0080271 A1 | 3/2015 | De Wolf |
| 2015/0114647 A1 | 4/2015 | Jiang |
| 2015/0200147 A1 | 7/2015 | Lien |
| 2015/0240147 A1 | 8/2015 | Jiang |
| 2015/0260021 A1 | 9/2015 | Reyes |
| 2015/0322762 A1 | 11/2015 | Varadaraj |
| 2015/0344771 A1 | 12/2015 | Jiang |
| 2016/0024370 A1* | 1/2016 | Ba geri ................ E21B 21/003 |
| | | 166/305.1 |
| 2016/0025895 A1 | 1/2016 | Ziauddin |
| 2016/0146964 A1 | 5/2016 | Badri |
| 2016/0237340 A1 | 8/2016 | Pandya |
| 2016/0298024 A1 | 10/2016 | Panga |
| 2017/0037304 A1 | 2/2017 | Rimassa |
| 2017/0267918 A1 | 9/2017 | Daeffler |
| 2018/0127638 A1* | 5/2018 | Thompson-Colón ....................... |
| | | C07C 237/06 |
| 2018/0201829 A1* | 7/2018 | Hikem .................. C09K 8/602 |
| 2018/0244981 A1 | 8/2018 | Panga |
| 2018/0244982 A1 | 8/2018 | Yakovlev |
| 2018/0273834 A1 | 9/2018 | Qiu |
| 2018/0282613 A1 | 10/2018 | Blackbourn |
| 2019/0010385 A1 | 1/2019 | Sayed |
| 2019/0194528 A1 | 6/2019 | Purdy |
| 2019/0292440 A1 | 9/2019 | Purdy |
| 2020/0224085 A1 | 7/2020 | Purdy |
| 2020/0224086 A1 | 7/2020 | Purdy |
| 2020/0270505 A1 | 8/2020 | Reddy |
| 2020/0318009 A1 | 10/2020 | Purdy |
| 2020/0399530 A1 | 12/2020 | Zakaria |
| 2021/0002543 A1 | 1/2021 | Jin |
| 2021/0130680 A1 | 5/2021 | Purdy |
| 2021/0189226 A1 | 6/2021 | Purdy |
| 2021/0198561 A1 | 7/2021 | Purdy |
| 2021/0253936 A1 | 8/2021 | Purdy |
| 2021/0277302 A1 | 9/2021 | Qiu |
| 2021/0380872 A1 | 12/2021 | Daeffler |
| 2023/0257645 A1 | 8/2023 | Daeffler |
| 2023/0279284 A1 | 9/2023 | Qiu |
| 2024/0309266 A1 | 9/2024 | Fernandez Del Valle |
| 2025/0059434 A1 | 2/2025 | Daeffler |

FOREIGN PATENT DOCUMENTS

| | | |
|---|---|---|
| CN | 110564398 A | 12/2019 |
| EP | 2524017 A1 | 11/2012 |
| KR | 1020200108408 A | 9/2020 |
| RU | 2247833 C1 | 3/2005 |
| WO | 2000019062 A1 | 4/2000 |
| WO | 03054352 A1 | 7/2003 |
| WO | 2004005672 A1 | 1/2004 |
| WO | 2006136262 A1 | 12/2006 |
| WO | 2009077958 A1 | 6/2009 |
| WO | 2011148282 A1 | 12/2011 |
| WO | 2014193546 A1 | 12/2014 |
| WO | 2015020688 A1 | 2/2015 |
| WO | 2015154977 A1 | 10/2015 |
| WO | 2016105996 A1 | 6/2016 |
| WO | 2016164056 A1 | 10/2016 |

(56) References Cited

FOREIGN PATENT DOCUMENTS

| WO | 2017040434 A1 | 3/2017 |
|---|---|---|
| WO | 2017040553 A1 | 3/2017 |
| WO | 2017040562 A1 | 3/2017 |
| WO | 2018018129 A1 | 2/2018 |
| WO | 2019245983 A1 | 12/2019 |
| WO | 2021126303 A1 | 6/2021 |
| WO | 2023283480 A1 | 1/2023 |
| WO | 2023287746 A1 | 1/2023 |
| WO | 2023049360 A1 | 3/2023 |
| WO | 2023102001 A1 | 6/2023 |
| WO | 2023183462 A1 | 9/2023 |

OTHER PUBLICATIONS

Baker, B. D. et al., "Stimulation Practices Using Alcoholic Acidizing and Fracturing Fluids for Gas Reservoirs", SPE-4836-MS presented at the SPE European Spring Meeting, 1974, 7 pages.
Bonn, M. et al.,"Suppression of Proton Mobility by Hydrophobic Hydration" J. Am. Chem. Soc. 2009, 131, 17070-17071.
Buijse, M. A, "Understanding wormholing mechanisms can improve acid treatments in carbonate formations", SPE Production Facilities, vol. 15, No. 3, 2000, pp. 168-175.
Callahan, K. M. et al., "Solvation of Magnesium Dication: Molecular Dynamics Simulation and Vibrational Spectroscopic Study of Magnesium Chloride in Aqueous Solution", J. Phys. Chem. A. 2010, 114, pp. 5141-5148.
Chemicalland21, "Lauryl alcohol ethoxlates", http://www.chamicalland21.com/specialtychem/perchem/lauryl%20alcohol%20ethoxylate.htm, Jan. 17, 2015, 5 pages.
Crowe, C.W.; et al., "Investigation of Retarded Acids Provides Better Understanding of Their Effectiveness and Potential Benefits", SPE 18222, SPE Production Engineering, May 1990, pp. 166-170.
Edward et al., "The Dielectric Increments of Amino Acids", J. Am. Chem. Soc. 1974, 96, pp. 902-906.
Fredd, C. N. et al., "Influence of Transport and Reaction on Wormhole Formation in Carbonate Porous Media", AIChE Journal, 1998, 44(9), pp. 1933-1949.
Ghommem, M. et al., "Carbonate Acidizing: Modeling, Analysis, and Characterization of Wormhole Formation and Propagation", Journal of Petroleum Science and Engineering, 2015, 131, pp. 18-33.
Liu, M. et al., "Wormhole Propagation Behavior Under Reservoir Condition in Carbonate Acidizing", Transport in porous Media, 2013, 96(1), pp. 203-220.
Lungwitz, B. et al., "Diversion and Cleanup Studies of Viscoelastic Surfactant-Based Self-Diverting Acid", SPE 86504, SPE International Symposium and Exhibition on Formation Damage Control, Feb. 18-20, 2004, 10 pages.
Mou, J. et al., "Diversion Conditions for Viscoelastic-Surfactant-Based Self-Diversion Acid in Carbonate Acidizing" SPE 173898, May 2015, SPE Production Operations, pp. 121-129.
Panga, M. K. R. et al., "Two-Scale Continuum Model for Simulation of Wormholes in Carbonate Acidization", AICHE J. 2005, 51, pp. 3231-3248.
Petrov, et al., "An Integrated approach to the treatment of the bottom-hole zone of the formation as a method for intensification of production", Scientific and technical journal Georesources, No. 1,(33), 2010, pp. 7-10, 8 pages with machine translation.
Scherubel, G. A. et al., "Foamed Acid, A New Concept in Fracture Acidizing" paper SPE 7568, presented at the Annual Fall Technical Conference and Exhibition, Houston, TX, USA, Oct. 1978, 8 pages.
Tardy, P. M. J. et al., "An Experimentally Validated Wormhole Model for Self-Diverting and Conventional Acids in Carbonate Rocks Under Radial Flow Conditions" paper SPE 107854, presented at the European Formation Damage Conference held in Scheveningen, The Netherlands, May 30-Jun. 1, 2007; 17 pages.

Travalani-Louvisse, A.M . et al., "The use of ethanol in oil well stimulation fluids", Journal of Petroleum Science and Engineering, 1990, 4(3), pp. 257-272.
Wyman, J. "Dielectric Constant: Ethanol-Diethyl Ether and Urea-Water Solutions between 0 and 50", J. Am. Chem. Soc. 1933, 55, pp. 4116-4121.
Xu, J. et al., "On the Origin of Proton Mobility Suppression in Aqueous Solutions in Amphiphiles", J. Phys. Chem. B. 2013, 117, 15426-15435.
Examination Report issued in GCC Patent Appl. No. GC 2016-31138 on Jul. 17, 2018; 4 pages.
International Search Report and Written Opinion issued in the PCT Aplication No. PCT/US2016/025967 dated Jul. 14, 2016, 9 pages.
Office Action issued in U.S. Appl. No. 18/305,765 dated Dec. 21, 2023, 18 pages.
International Search Report and Written Opinion issued in International Patent Appl. No. PCT/US2016/049335 on Nov. 17, 2016; 9 pages.
PCT International Preliminary Report on Patentability; Application No. PCT/US2016/049335; Dated Mar. 15, 2018; 8 pages.
Eurasian Office Action issued in Eurasian Patent Application No. 201890638 on Oct. 2, 2018; 6 pages (with English Translation).
Examination Report issued in related GC Application GC 2016-39640 on Jul. 8, 2021; 5 pages.
Examination Report issued in the related GC Application GC/2016/31967 dated Nov. 20, 2018 (4 pages).
Third Examination Report issued in the related GC Application GC/2016/31967 dated Feb. 17, 2021, 4 pages.
Eurasian Office Action issued in Eurasian Patent Application No. 201890637 Mar. 27, 2019; 12 pages (with English Translation).
Examination Report issued in the related GC Application GC/2016/31966 dated Nov. 26, 2018 (4 pages).
International Search Report and Written Opinion issued in International Patent Application No. PCT/US2016/049538 on Nov. 10, 2016; 10 pages.
International Preliminary Report on Patentability issued in International Patent Application No. PCT/US2018/024439 on Oct. 10, 2019; 10 pages.
Extended European Search Report issued in European Patent Appl. No. 18776307.3 on Dec. 10, 2020; 9 pages.
Exam Report Issued in Qatar Patent Application No. QA/201909/000510 dated Oct. 29, 2023, 5 pages with English translation.
Office Action issued in Kazakhstan Patent Appl. No. 2019/0788.1 on Nov. 2, 2020; 15 pages (with English translation).
International Search Report and Written Opinion issued in International Patent Appl. No. PCT/US2018/024439 on Jul. 12, 2018; 14 pages.
Substantive Exam issued in Saudi Arabian Patent Application No. 519410203 dated May 24, 2022, 10 pages with English translation.
Office Action issued in U.S. Appl. No. 18/577,787 dated Nov. 8, 2024, 39 pages.
International Search Report and Writtin Opinion issued in the PCT Application No. PCT/US2022/036641 dated Nov. 4, 2022, 13 pages.
Office Action issued in U.S. Appl. No. 18/689,334 dated Aug. 30, 2024, 10 pages.
Office Action issued in U.S. Appl. No. 18/689,334 dated Jul. 25, 2024, 24 pages.
Search Report and Written Opinion of International Patent Application No. PCT/US2022/044553 dated Jan. 18, 2023, 6 pages.
Office Action issued in U.S. Appl. No. 18/691,989 dated Oct. 11, 2024, 22 pages.
Search Report and Written Opinion of International Patent Application No. PCT/US2022/051322 dated Apr. 14, 2023, 7 pages.
Search Report and Written Opinion of International Patent Application No. PCT/US2023/016026 dated Jul. 7, 2023, 8 pages.
Search Report and Written Opinion of International Patent Application No. PCT/US2023/016032 dated Jul. 18, 2023, 9 pages.

\* cited by examiner

SINGLE-PHASE RETARDED ACID BASED ON A CATIONIC SURFACTANT

CROSS-REFERENCE TO RELATED APPLICATION

This application claims priority to and benefit of U.S. Provisional Patent Application No. 63/269,813, entitled "Single Phase Retarded Acid Based on a Cationic Surfactant", filed on Mar. 23, 2022, which is incorporated herein by reference.

TECHNICAL FIELD

This disclosure relates to compositions of single-phase retarded acids and methods of preparation and use thereof.

BACKGROUND

This section provides background information to facilitate a better understanding of the various aspects of the disclosure. It should be understood that the statements in this section of this document are to be read in this light, and not as admissions of prior art.

Hydrocarbon fluids such as oil and natural gas are obtained from a subterranean geologic formation, commonly referred to as a reservoir, by drilling a well that penetrates the hydrocarbon-bearing formation. Once a wellbore is drilled, various forms of well completion components may be installed to control and enhance the efficiency of producing the various fluids from the reservoir. Well treatment methods often are used to increase hydrocarbon production by using a chemical composition, such as a treatment fluid.

Stimulation operations may be performed to facilitate production of fluids from subsurface formations by increasing the net permeability of a reservoir. There are two main stimulation techniques: matrix stimulation and fracturing. Matrix stimulation is accomplished by injecting a fluid (e.g., acid or solvent) to dissolve and/or disperse materials that impair well production. Specifically, matrix stimulation may be performed (1) by injecting chemicals into the wellbore to react with and dissolve damage or (2) by injecting chemicals through the wellbore and into the formation to react with and dissolve small portions of the formation, thereby creating alternative flow paths for the hydrocarbon (i.e., instead of removing the damage, redirecting flow around the damage). Fracturing is a technique whereby a treatment fluid is injected through the wellbore and into the formation at pressures higher than the fracture initiation pressure of the formation. The resulting fracture creates a large flow channel through which hydrocarbons can more readily flow from the formation and into the wellbore.

In carbonate formations (e.g., formations composed of calcite, limestone, dolomite or a combination thereof), the goal of matrix stimulation is to create new, unimpaired flow channels from the formation to the wellbore. Matrix stimulation, typically called matrix acidizing when the stimulation fluid is an acid, is generally used to treat the near-wellbore region. The near-wellbore region may be defined as the formation that surrounds the wellbore within a distance shorter than about 50 feet. In a matrix acidizing treatment, the acid (e.g., hydrochloric acid for carbonates) is injected at a rate and pressure lower than the fracture initiation pressure. During injection the acid may form conductive "wormholes" that extend radially from the wellbore. Acids may also be injected into subterranean formation at rates and pressures higher than the fracture initiation pressure. In this case, the acid unevenly dissolves the walls of the fracture, so that when the injection is stopped and the fracture closes, conductive channels to the wellbore remain.

In carbonate reservoirs, one problem that may be associated with the application of inorganic acids at elevated temperatures (e.g., 200° F. and above), is their excessive reaction rate owing to a lack of restriction to the mobility of the protons. For example, HCl is very reactive, and higher temperatures and/or low injection rates may favor facial dissolution over wormhole formation. As a result, penetration of acid into the near-wellbore region may reach no further than a few inches. For this reason, less reactive acid formulations have been pursued. One approach is to use organic acids such as lactic, formic and acetic acid. Organic acids have higher $pK_a$'s than HCl, but may not completely spend in the reservoir. A second approach is to suspend the acid as a water-in-oil emulsion, which restricts aqueous acid contact with the reservoir and thus slows the reaction rate.

SUMMARY

Certain embodiments commensurate in scope with the originally claimed disclosure are summarized below. These embodiments are not intended to limit the scope of the claimed disclosure, but rather these embodiments are intended only to provide a brief summary of possible forms of the disclosure. Indeed, embodiments may encompass a variety of forms that may be similar to or different from the embodiments set forth below.

The present disclosure proposes a single-phase retarded acid based on a cationic surfactant.

In a first aspect of the disclosure, embodiments relate to composition(s) that include water, an acid, and an acid retarding agent that includes an alkyl dimethyl benzyl ammonium chloride.

In another aspect of the disclosure, embodiments relate to method(s) that include preparing a composition including water, an acid, and an acid retarding agent. The acid retarding agent includes an alkyl dimethyl benzyl ammonium chloride. The method also includes injecting the composition into a wellbore penetrating a subterranean formation.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
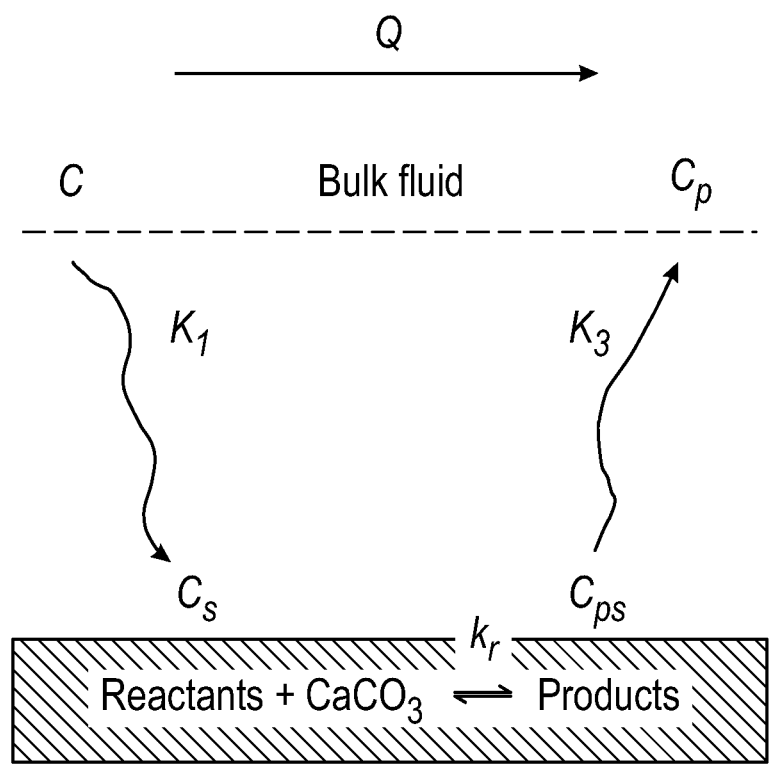
FIG. 1 presents a schematic diagram of the dissolution of a calcite rock surface by an acid, according to an embodiment of the disclosure.

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation-specific decisions are made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the disclosure and this detailed description, each numerical value should be read once as modified by the term "about" (unless already expressly so modified), and then read again as not so modified unless otherwise indicated in context. The term about should be understood as any amount or range within 10% of the recited amount or range (for example, a range from about 1 to about 10 encompasses a range from 0.9 to 11). Also, in the summary and this detailed description, it should be understood that a concentration range listed or described as being useful, suitable, or the like, is intended that any concentration within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, even if specific data points within the range, or even no data points within the range, are explicitly identified or refer to a few specific, it is to be understood that inventors appreciate and understand that any data points within the range are to be considered to have been specified, and that inventors possessed knowledge of the entire range and the points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

As used herein, "embodiments" refers to non-limiting examples disclosed herein, whether claimed or not, which may be employed or present alone or in any combination or permutation with one or more other embodiments. Each embodiment disclosed herein should be regarded both as an added feature to be used with one or more other embodiments, as well as an alternative to be used separately or in lieu of one or more other embodiments. It should be understood that no limitation of the scope of the claimed subject matter is thereby intended, any alterations and further modifications in the illustrated embodiments, and any further applications of the principles of the application as illustrated therein as would normally occur to one skilled in the art to which the disclosure relates are contemplated herein.

Moreover, the schematic illustrations and descriptions provided herein are understood to be examples only, and components and operations may be combined or divided, and added or removed, as well as re-ordered in whole or part, unless stated explicitly to the contrary herein. Certain operations illustrated may be implemented by a computer executing a computer program product on a computer readable medium, where the computer program comprises instructions causing the computer to execute one or more of the operations, or to issue commands to other devices to execute one or more of the operations.

The terms "formation" or "subterranean formation" as utilized herein should be understood broadly, and are used interchangeably. A formation includes any underground fluidly porous formation, and can include without limitation any oil, gas, condensate, mixed hydrocarbons, paraffin, kerogen, water, and/or $CO_2$ accepting or providing formations. A formation can be fluidly coupled to a wellbore, which may be an injector well, a producer well, and/or a fluid storage well. The wellbore may penetrate the formation vertically, horizontally, in a deviated orientation, or combinations of these. The formation may include any geology, including at least a sandstone, limestone, dolomite, shale, tar sand, and/or unconsolidated formation. The wellbore may be an individual wellbore and/or a part of a set of wellbores directionally deviated from a number of close proximity surface wellbores (e.g. off a pad or rig) or single initiating wellbore that divides into multiple wellbores below the surface.

The term "oilfield treatment fluid" as utilized herein should be understood broadly. In certain embodiments, an oilfield treatment fluid includes any fluid having utility in an oilfield type application, including a gas, oil, geothermal, or injector well. In certain embodiments, an oilfield treatment fluid includes any fluid having utility in any formation or wellbore described herein. In certain embodiments, an oilfield treatment fluid includes a matrix acidizing fluid, a wellbore cleanup fluid, a pickling fluid, a near wellbore damage cleanup fluid, a surfactant treatment fluid, an unviscosified fracture fluid (e.g. slick water fracture fluid), and/or any other fluid consistent with the fluids otherwise described herein. An oilfield treatment fluid may include any type of additive known in the art, which are not listed herein for purposes of clarity of the present description, but which may include at least friction reducers, inhibitors, surfactants and/or wetting agents, fluid diverting agents, particulates, acid retarders (except where otherwise provided herein), organic acids, chelating agents, energizing agents (e.g. $CO_2$ or $N_2$), gas generating agents, solvents, emulsifying agents, flowback control agents, resins, breakers, and/or non-polysaccharide based viscosifying agents.

The term "high pressure pump" as utilized herein should be understood broadly. In certain embodiments, a high pressure pump includes a positive displacement pump that provides an oilfield relevant pumping rate—for example at least 0.5 barrels per minute (bpm), although the specific example is not limiting. A high pressure pump includes a pump capable of pumping fluids at an oilfield relevant pressure, including at least 500 psi, at least 1,000 psi, at least 2,000 psi, at least 5,000 psi, at least 10,000 psi, up to 15,000 psi, and/or at even greater pressures. Pumps suitable for oilfield cementing, matrix acidizing, and/or hydraulic fracturing treatments are available as high pressure pumps, although other pumps may be utilized.

The term "treatment concentration" as utilized herein should be understood broadly. A treatment concentration in the context of an HCl concentration is a final concentration of the fluid before the fluid is positioned in the wellbore and/or the formation for the treatment, and can be any concentration necessary to provide sufficient acidic function. The treatment concentration may be the mix concentration available from the HCl containing fluid at the wellsite or other location where the fluid is provided from. The treatment concentration may be modified by dilution before the treating and/or during the treating. Additionally, the treatment concentration may be modified by the provision of additives to the fluid. In certain embodiments, a treatment concentration is determined upstream of additives delivery (e.g. at a blender, hopper, or mixing tub) and the concentration change from the addition of the additives is ignored. In certain embodiments, the treatment concentration is a liquid phase or acid phase concentration of a portion of the final fluid.

As mentioned above, hydrocarbon fluids such as oil and natural gas are obtained from a subterranean geologic formation, commonly referred to as a reservoir, by drilling a well that penetrates the hydrocarbon-bearing formation. Once a wellbore is drilled, various forms of well completion components may be installed to control and enhance the efficiency of producing the various fluids from the reservoir. Well treatment methods often are used to increase hydrocarbon production by using a chemical composition, such as a treatment fluid.

Stimulation operations may be performed to facilitate production of fluids from subsurface formations by increasing the net permeability of a reservoir. There are two main stimulation techniques: matrix stimulation and fracturing. Matrix stimulation is accomplished by injecting a fluid (e.g., acid or solvent) to dissolve and/or disperse materials that impair well production. Specifically, matrix stimulation may be performed (1) by injecting chemicals into the wellbore to react with and dissolve damage or (2) by injecting chemicals through the wellbore and into the formation to react with and dissolve small portions of the formation, thereby creating alternative flow paths for the hydrocarbon (i.e., instead of removing the damage, redirecting flow around the damage). Fracturing is a technique whereby a treatment fluid is injected through the wellbore and into the formation at pressures higher than the fracture initiation pressure of the formation. The resulting fracture creates a large flow channel through which hydrocarbons can more readily flow from the formation and into the wellbore.

In carbonate formations (e.g., formations composed of calcite, limestone, dolomite or a combination thereof), the goal of matrix stimulation is to create new, unimpaired flow channels from the formation to the wellbore. Matrix stimulation, typically called matrix acidizing when the stimulation fluid is an acid, is generally used to treat the near-wellbore region. The near-wellbore region may be defined as the formation that surrounds the wellbore within a distance shorter than about 50 feet. In a matrix acidizing treatment, the acid (e.g., hydrochloric acid for carbonates) is injected at a rate and pressure lower than the fracture initiation pressure. During injection the acid may form conductive "wormholes" that extend radially from the wellbore. Acids may also be injected into subterranean formation at rates and pressures higher than the fracture initiation pressure. In this case, the acid unevenly dissolves the walls of the fracture, so that when the injection is stopped and the fracture closes, conductive channels to the wellbore remain.

In carbonate reservoirs, one problem that may be associated with the application of inorganic acids at elevated temperatures (e.g., 200° F. and above), is their excessive reaction rate owing to a lack of restriction to the mobility of the protons. For example, HCl is very reactive, and higher temperatures and/or low injection rates may favor facial dissolution over wormhole formation. As a result, penetration of acid into the near-wellbore region may reach no further than a few inches. For this reason, less reactive acid formulations have been pursued. One approach is to use organic acids such as lactic, formic and acetic acid. Organic acids have higher $pK_a$'s than HCl, but may not completely spend in the reservoir. A second approach is to suspend the acid as a water-in-oil emulsion, which restricts aqueous acid contact with the reservoir and thus slows the reaction rate.

Other approaches have been applied toward retarding the acid reactivity. For example, the inorganic acid may be encapsulated by shells of polymer gel, thickened by linear or crosslinked gels or viscoelastic surfactants, or mixed with chelating agents. Such acid systems are commonly referred to as "retarded acids."

More recently, acid retarding agents (RA) based on salt compounds have been introduced. The salt compound used in the RA may be selected from compounds having one or more cations selected from lithium, sodium, potassium, rubidium, cesium, beryllium, magnesium, calcium, strontium, barium, scandium, yttrium, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, boron, aluminum, gallium, indium, thallium, tin, ammonium, alkylammonium, dialkylammonium, trialkylammonium and tetraalkylammonium, and one or more anions selected from fluoride, chloride, bromide, iodide, sulfate, bisulfate, sulfite, bisulfite nitrate, alkanesulfonates, arylsulfonates, acetate and formate. The RA may be magnesium chloride. In such systems, the acid may be present at concentrations between about 7.5 wt % and 36 wt %, based on the total weight of the composition.

Aqueous compositions described below and useful in accordance with the disclosure exhibit a retarded acid reactivity that facilitates greater depth of fracture and/or matrix acidizing. In certain embodiments, a composition includes water, an acid, and an acid retarding agent. In particular, the acid retarding agent includes an alkyl dimethyl benzyl ammonium chloride. Additionally, in certain embodiments, a method includes preparing a composition that includes water, an acid, and an acid retarding agent that includes an alkyl dimethyl benzyl ammonium chloride. After preparing the composition, the method may also include injecting the composition into a wellbore penetrating a subterranean formation.

The alkyl dimethyl benzyl ammonium chloride (ADBAC) has the following structure:

Formula I

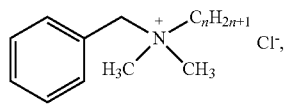

wherein n is an integer comprised between 8 and 18.

The role of the ADBAC surfactant is to attach to the rock surface, occupying sites where protons would normally bind and react. A schematic diagram of the process is shown in FIG. 1. As a bulk acidizing fluid passes over a calcite rock surface at a velocity Q, protons migrate to the surface. Dissolution of the calcite takes place at a rate $k_r$. The surfactant of the disclosure interacts with the calcite rock surface such that the value of $k_r$ is reduced.

For all aspects, the acid may comprise hydrogen chloride, hydrogen bromide, hydrogen iodide, hydrogen fluoride, sulfuric acid, nitric acid, phosphoric acid, alkanesulfonic acids or arylsulfonic acids, or combinations thereof. The acid (e.g., hydrochloric acid) may be present at a concentration between 7.5 wt % and 36 wt %, or between 10.0 wt % and 28 wt %, or between 15.0 wt % and 18.0 wt %.

For all aspects, the alkyl dimethyl benzyl ammonium chloride may comprise between 14% and 40% $C_{12}$, 50% and 58% $C_{14}$ and 10% and 28% $C_{16}$.

For all aspects, the alkyl dimethyl benzyl ammonium chloride is present at a concentration between 0.1 wt % and 5.0 wt %, or between 1.0 wt % and 2.0 wt %.

For all aspects, the composition may further comprise corrosion inhibitors, friction reducers, iron control additives, diverting agents, or fluid-loss control agents, or combinations thereof.

With regard to the disclosed methods, the temperature of subterranean formation may be between 100° F. and 300° F., or between 150° F. and 250° F. The subterranean formation may comprise calcite, limestone, or dolomite, or a combination thereof.

The composition may be injected into the wellbore at a pressure lower than the fracture initiation pressure of the subterranean formation. Or, the composition may be injected into the wellbore at a pressure equal to or higher than a fracture initiation pressure of the subterranean formation.

EXAMPLES

In the examples, limestone discs (1-in. diameter and 0.25-in thickness) were submerged into acid solutions at 160° F. During the test period the limestone discs were periodically removed from the solutions, dried with a paper towel, weighed and then returned to the solutions. Thus, a dissolution rate could be determined.

Two ADBAC solutions were tested. ADBAC #1 contained the following mix of alkyl groups: 14% $C_{12}$, 58% $C_{14}$ and 28% $C_{16}$. ADBAC #2 contained the following mix of alkyl groups: 40% $C_{12}$, 50% $C_{14}$ and 10% $C_{16}$.

Example 1

In this example, the limestone discs were submerged in a 20 wt % HCl solution at 160° F.

Figure 2:
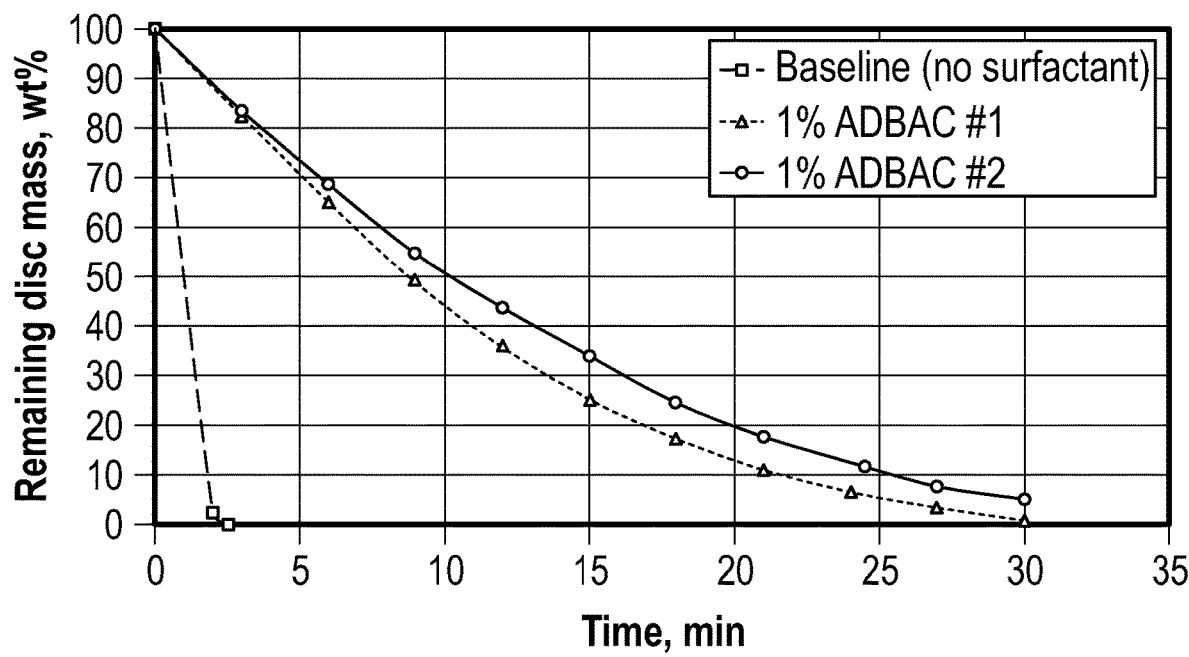
FIG. 2 presents the results of limestone dissolution tests conducted in 20% HCl solutions, with and without the presence of the alkyl dimethyl benzyl ammonium chloride surfactant.

As shown in FIG. 2, the limestone discs submerged in solutions containing 1% ADBAC 1 or ADBAC 2 dissolved significantly slower than the disc in the control solution containing no surfactant.

Example 2

Aging tests were conducted to determine the thermal stability of ADBAC. Solutions of 20% HCl, containing 1% ADBAC 2 were aged in an oven for 4 hours at 250° F. Following the thermal treatment, limestone dissolution tests were conducted.

Figure 3:
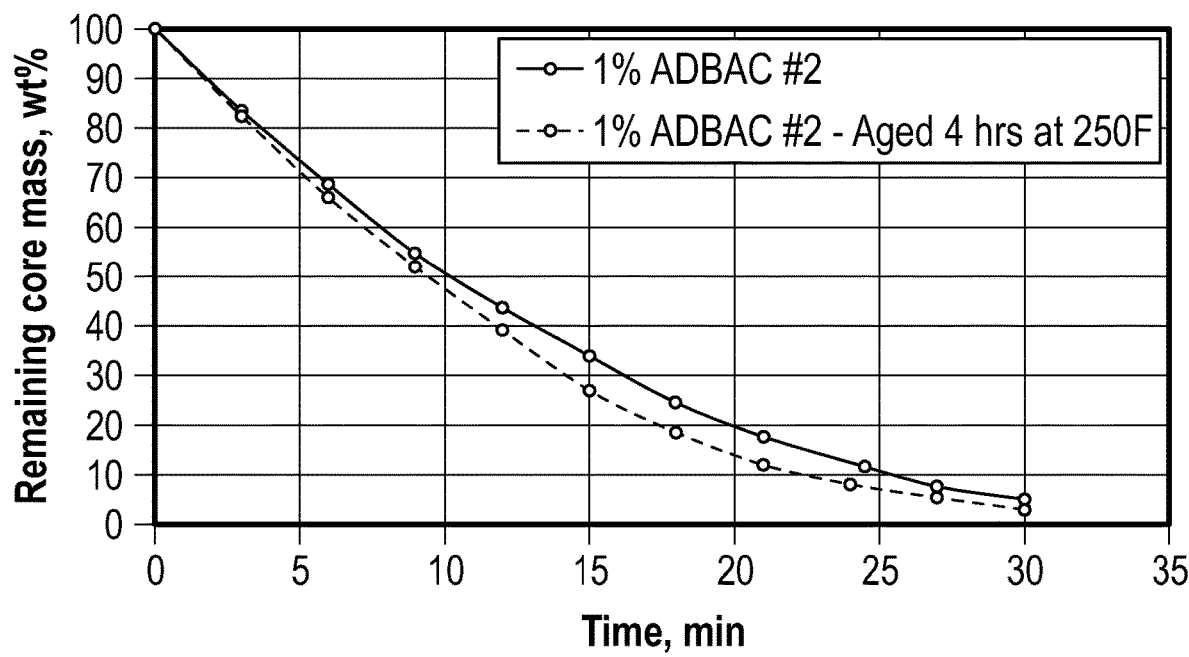
FIG. 3 presents the results of limestone dissolution tests conducted in 20% HCl solutions containing alkyl dimethyl benzyl ammonium chloride surfactant.

As shown in FIG. 3, ADBAC 2 is thermally stable at low pH and high temperature.

The preceding description has been presented with reference to present embodiments. Persons skilled in the art and technology to which this disclosure pertains will appreciate that alterations and changes in the described structures and methods of operation can be practiced without meaningfully departing from the principle, and scope of this present disclosure. Accordingly, the foregoing description should not be read as pertaining only to the precise structures described and shown in the accompanying drawings, but rather should be read as consistent with and as support for the following claims, which are to have their fullest and fairest scope.

The invention claimed is:

1. A method, comprising:
preparing a composition comprising water, an acid and an acid retarding agent comprising an alkyl dimethyl benzyl ammonium chloride, wherein the acid is present at a concentration between 7.5 wt % and 36 wt %, wherein the alkyl dimethyl benzyl ammonium chloride is present at a concentration between 0.1 wt % and 5.0 wt %, and wherein the alkyl dimethyl benzyl ammonium chloride comprises about 14% C12, about 58% C14, and about 28% C16; and
injecting the composition into a wellbore penetrating a carbonate subterranean formation, wherein the temperature of the carbonate subterranean formation is greater than or equal to 160° F.

2. The method of claim 1, wherein the acid comprises hydrogen chloride, hydrogen bromide, hydrogen iodide, hydrogen fluoride, sulfuric acid, nitric acid, phosphoric acid, alkanesulfonic acids or arylsulfonic acids, or combinations thereof.

3. The method of claim 1, further comprising corrosion inhibitors, friction reducers, iron control additives, diverting agents, or fluid-loss control agents, or combinations thereof.

4. The method of claim 1, wherein the carbonate subterranean formation further comprises calcite, limestone, dolomite or a combination thereof.

5. The method of claim 1, wherein the composition is injected into the wellbore at a pressure lower than a fracture initiation pressure of the carbonate subterranean formation.

6. The method of claim 1, wherein the composition is injected into the wellbore at a pressure equal to or higher than a fracture initiation pressure of the carbonate subterranean formation.

7. The method of claim 1, wherein the acid is present at a concentration between 10.0 wt % and 28 wt %.

8. The method of claim 1, wherein the acid is present at a concentration between 15.0 wt % and 18.0 wt %.

9. The method of claim 1, wherein the alkyl dimethyl benzyl ammonium chloride is present at a concentration between 0.1 wt % and 2.0 wt %.

10. The method of claim 1, wherein the acid is present at a concentration greater than 20 wt % and less than or equal to 36 wt %.

* * * * *